(12) United States Patent
Feldman et al.

(10) Patent No.: US 8,898,164 B1
(45) Date of Patent: Nov. 25, 2014

(54) CONSUMPTION HISTORY PRIVACY

(75) Inventors: Konrad S. Feldman, New York City, NY (US); Paul G. Sutter, San Francisco, CA (US); Michael Recce, South Orange, NJ (US)

(73) Assignee: Quantcast Corporation, San Francisco, CA (US)

( * ) Notice: Subject to any disclaimer, the term of this patent is extended or adjusted under 35 U.S.C. 154(b) by 452 days.

(21) Appl. No.: 13/299,313

(22) Filed: Nov. 17, 2011

(51) Int. Cl.
*G06F 7/00* (2006.01)
*G06F 17/30* (2006.01)

(52) U.S. Cl.
USPC ............... 707/736; 705/14.53; 705/14.73

(58) Field of Classification Search
CPC .......... G06Q 30/0277; G06Q 30/0255; G06Q 30/0256; G06Q 30/0271
USPC ............... 707/706, 736, 748, 749, 750, 751; 705/14.73, 14.49, 14.53, 14.54, 14.66, 705/14.67
See application file for complete search history.

(56) References Cited

U.S. PATENT DOCUMENTS

| | | | |
|---|---|---|---|
| 7,698,422 B2 * | 4/2010 | Vanderhook et al. | 709/224 |
| 7,921,069 B2 * | 4/2011 | Canny et al. | 706/47 |
| 8,006,261 B1 * | 8/2011 | Haberman et al. | 725/34 |
| 8,504,411 B1 * | 8/2013 | Subasic et al. | 705/7.33 |
| 8,533,141 B2 * | 9/2013 | Doig et al. | 706/47 |
| 2003/0046281 A1 * | 3/2003 | Son | 707/6 |
| 2004/0181525 A1 * | 9/2004 | Itzhak et al. | 707/5 |
| 2006/0053048 A1 * | 3/2006 | Tandetnik | 705/14 |
| 2007/0061301 A1 * | 3/2007 | Ramer et al. | 707/3 |
| 2007/0233671 A1 * | 10/2007 | Oztekin et al. | 707/5 |
| 2008/0086741 A1 | 4/2008 | Feldman et al. | |
| 2008/0243838 A1 * | 10/2008 | Scott et al. | 707/5 |
| 2010/0211960 A1 * | 8/2010 | Sirajuddin et al. | 719/313 |
| 2012/0023046 A1 * | 1/2012 | Verma et al. | 706/12 |

OTHER PUBLICATIONS

U.S. Appl. No. 12/761,327, filed Apr. 15, 2010, Inventors: Paul G. Sutter et al. [Copy Not Enclosed].
U.S. Appl. No. 12/498,628, filed Jul. 7, 2009, Inventors: Charles W. Sugnet et al. [Copy Not Enclosed].
U.S. Appl. No. 12/544,853, filed Aug. 20, 2009, Inventors: Paul G. Sutter et al. [Copy Not Enclosed].
U.S. Appl. No. 13/275,098, filed Oct. 17, 2011, Inventors: Paul G. Sutter et al. [Copy Not Enclosed].

* cited by examiner

*Primary Examiner* — Marc Somers
(74) *Attorney, Agent, or Firm* — Fenwick & West LLP

(57) ABSTRACT

An audience selection system for the selection of an entity, based on an entity's consumption history without requiring the storage of a content descriptor for identifying content previously accessed by the entity. By directly and/or indirectly observing the usage of words used to locate content through a search engine over time for a population, a list of depersonalized keywords can be discovered, creating the ability to characterize content based on depersonalized keywords. A protected consumption history can be recorded for an entity using depersonalized keywords instead of recording a content descriptor for identifying the content. Depersonalized keywords do not uniquely identify content. Associating depersonalized keywords with an entity does not mean that the entity has used those depersonalized keywords; it only means that the entity has accessed content which has been accessed in the past by other entities in a population using the depersonalized keywords.

14 Claims, 5 Drawing Sheets

---

Content is mapped to depersonalized keywords (Step 410).

A record of the consumption of content over a network by an entity, including a content descriptor is received at the system 100 (Step 420).

A set of one or more depersonalized keywords previously mapped to the content descriptor are identified and the consumption history of the entity is recorded in storage by recording the set of depersonalized keywords (Step 430).

The consumption history for an entity is analyzed by the selector module 148 based on at least on selection criterion (Step 440).

CONSUMPTION HISTORY PRIVACY

FIELD OF INVENTION

The invention relates to methods and systems for protecting the privacy of entities receiving content over a network.

BACKGROUND

Information collected during Internet browsing has traditionally been used to select entities for the delivery of online advertising and/or customized content. For example, a direct measurement system can collect information associated with entities such as individual Internet browser installations used to browse the Internet. When an entity requests content from a content provider over a network, such as a request from a web browser operating on a personal computer to display the content of a web page of an online publisher, the content provider can redirect the entity to submit a pixel request to the direct measurement system. Based on the pixel request, and optional subsequent actions and/or interactions, the direct measurement system can collect and/or receive information from the entity and/or information associated with the entity, such as the exact URL (Uniform Resource Locator) of the accessed page. In some cases, additional information can be available, such as the URL of a referring webpage and search keywords which may have been used by the entity in an online search engine to locate the accessed page.

There is growing concern among privacy advocates regarding the collection of this type of information, such as a history of website visitation, per user.

What is needed is a way to receive and analyze information, for example a history of the webpages visited by an entity, which can be used to select entities for the purpose of marketing and/or content customization, while respecting privacy concerns related to the usage and retention of an online consumption history.

SUMMARY

Embodiments of the invention provide an audience selection system, method, and computer-readable medium for the selection of an entity, based on an entity's consumption history without requiring the storage of a content descriptor for identifying content accessed by the entity in that entity's consumption history. In an embodiment, content, which can be provided by a content provider over a network, is characterized using depersonalized keywords. The depersonalized keywords include words submitted to an online search engine by entities from a population of entities in the past to locate the content. By directly and/or indirectly observing the usage of locator keywords and/or referral keywords used to locate content through a search engine over time for a population, a list of depersonalized keywords can be associated with specific content and/or content providers, creating the ability to characterize content based on depersonalized keywords. Once content has been characterized with depersonalized keywords, the protected consumption history of an entity can be recorded using the depersonalized keywords in conjunction with the entity instead of recording a content descriptor, such as a URL, for identifying the content.

In an embodiment, the system receives information from a direct measurement system. The direct measurement system receives information related to the access of content over a network by an entity, including a content descriptor. A mapping module can identify the list of depersonalized keywords associated with the content descriptor provided by the direct measurement system. The audience selection system automatically maps the content descriptor to a list of depersonalized keywords and records the consumption of the content in the protected consumption history of the entity by recording the content's depersonalized keywords in association with the entity. In some cases, this is done instead of using the content descriptor for identifying the content. The content descriptors for identifying the content, such as URLs, domain names, serial numbers and/or other unique identifiers, can be discarded. Advantageously, the depersonalized keywords do not uniquely identify content, such as a website URL, or the location of the content, such as the domain name of a website. In addition, associating depersonalized keywords with an entity does not mean that the entity has used the depersonalized keywords in the past; associating depersonalized keywords with an entity only means that the entity has accessed content which has been accessed in the past by other entities in a population using the depersonalized keywords. In an embodiment, by recording depersonalized keywords and discarding content descriptors used to identify content, the direct relationship between a accessing a specific item of content and an entity can be broken in the recorded consumption history, while still retaining the ability to mine the protected consumption history for information which indicates past behavior by an entity. For example, the audience selection system's consumption history can be analyzed by examining the frequency, sequence and/or timing of the appearance of depersonalized keywords. The protected consumption history can be used in a variety of commercial applications such as online advertisement targeting, online content customization and/or intention marketing.

In an embodiment, modeling techniques such as behavioral modeling can be used to analyze the suitability of an entity for an online advertising campaign by analyzing protected consumption histories comprising depersonalized keywords.

Advantageously, in some embodiments, recording depersonalized keywords in conjunction with an entity can provide a compact and expressive representation of the entity's consumption history while still protecting consumer privacy.

Advantageously, in some embodiments, recording a consumption history for an entity by storing depersonalized keywords (instead of using locator keywords actually used by that entity and/or instead of recording content descriptors) can provide a useful abstraction of the events in a consumption history which result in the creation of improved behavioral modeling with better and/or more relevant predictive capabilities.

DETAILED DESCRIPTION OF THE INVENTION

Figure 1:
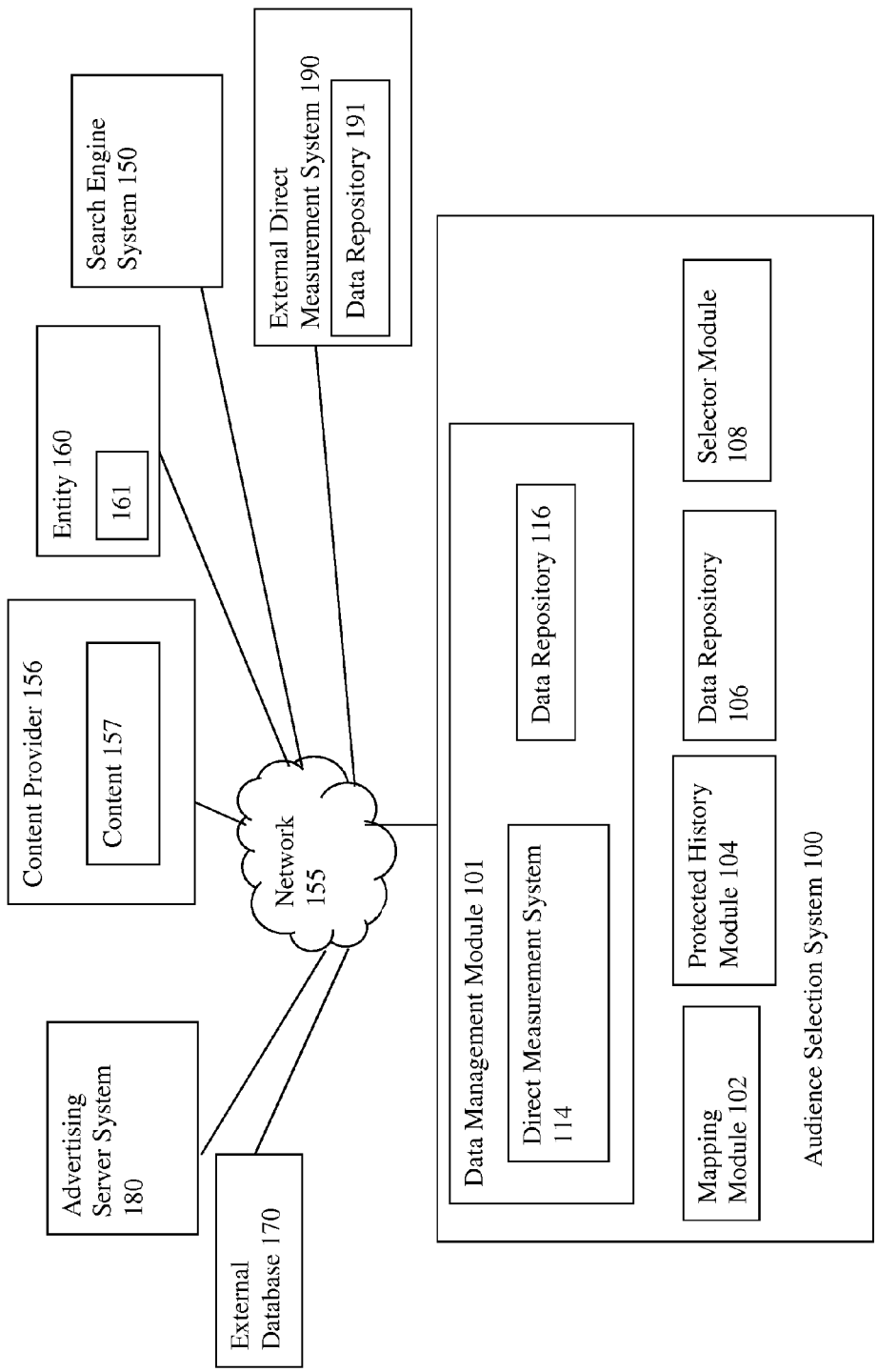
FIG. 1 illustrates an example computing environment in accordance with an embodiment.

FIG. 1 illustrates an example computing environment in accordance with an embodiment. As shown in FIG. 1, the computing environment includes an audience selection system 100, a search engine system 150, content provider 156, at least one entity 160, an external database 170, an external direct measurement system 190 and an advertising server system 180. These elements are connected by a communication network 155, such as a local area network, a wide area network, a wireless network, an intranet, a cable network, a satellite network, a cellular phone network, an optical network, the Internet or combinations thereof.

Content provider 156 provides content 157 over the communication network 155 to entity 160. Examples of a content provider 156 can include web site operators and cable television operators. Examples of content 157 can include, but are not limited to, a webpage, a portion of an online video clip, a portion of a networked television program, a portion of a cable television program, a portion of a satellite television program, a portion of an Internet Protocol (IP) television program, a portion of an online audio clip, the results of a keyword search from an online search engine, the results of a request for directions from an online mapping service, advertising content and interfaces for making online purchases.

In some examples, content can comprise aggregate content. The collection of webpages accessed through a website, such as www.website.com or a sub-site, such as www.website.com/sports are each examples of aggregate content. The set of audio files in a directory of audio files available in an online audio database is another example of aggregate content. In another example, content can be aggregated by category. A category can reflect the function of the content and/or the substance of the content, such as the set of websites operated by shoe vendors or the set of movie review websites. In another example, content can be aggregated by categorizing content based on the similarity of their respective audiences.

Content can be identified using a content descriptor, such as, but not limited to, a name, a filename, an identifier, an IP address, a network address, a URL, a domain name, a hostname or combinations thereof. Content descriptors may or may not be unique. For example, website content can change as websites are updated over time; a content descriptor such as a URL without an associated time and date stamp can be non-unique. In another example, aggregate content such as the collection of webpages accessible through a website, can be identified with a single content descriptor, such as a domain name. In some examples, the content 157 can be provided based on a request to the content provider 156; in some examples, the content provider 156 can push the content 157. Although only one content provider 156 is shown in FIG. 1 for clarity, any number of content providers may be connected to the communication network 155.

In various embodiments, entity 160 accesses content 157 from content provider 156 over the communication network 155. Examples of entities can include consumers, software installations or hardware devices used to access content or combinations thereof. A consumer is a person or group of people who access content. Software installations can include a web browser instance, video viewer instance or set-top box software residing on a hardware device. A hardware device can comprise a computer, personal digital assistant (PDA), cell phone or set-top unit (STU) such as a STU used in conjunction with cable television service. In some cases, an entity 160 can comprise a combination of entities which are logically grouped together to represent individuals, households or groups of individuals who access content 157. Although only one entity 160 is shown in FIG. 1 for clarity, any number of entities may be connected to the communication network 155.

As shown in the embodiment of FIG. 1, entity 160 contains identifier 161. Identifier 161 can be used to identify the entity 160. For example, a hardware device identifier such as a Media Access Control Address (MAC address) can be stored on a device. A software identifier such as a cookie value can be stored locally. In another embodiment, identifiers used to identify entities can be partially or wholly composed and/or stored remotely from an entity.

In an example embodiment of the invention, audience selection system 100 includes data management module 101 for receiving information including consumption histories associated with entities, mapping module 102 for characterizing content with depersonalized keywords, protected history module 104 for creating protected consumption histories, data repository 106 for storing maps and protected consumption histories and selector module 108 for assessing the suitability of entities in the data repository 106 for selection.

In an embodiment, data management module 101 can comprise a direct measurement system which can collect and/or receive information for an entity 160 and a data repository 116, which is a data store such as a database, for storing information. Information can include a consumption history for an entity 160 and attribute values. For example, a consumption history can document one or more media consumption events. A media consumption event records the act of accessing content 157 over a network 155 by an entity 160, such as, but not limited to, an entity accessing a web page from a web server. In an example, a content descriptor for identifying the content 157 can become part of the consumption history. In some cases, additional information such as the referring webpage and/or search terms used to locate the content can be collected and/or received by the direct measurement system 114.

In some cases, a direct measurement system 114 can collect and/or receive information in conjunction with an identifier. For example, information can be collected and/or received in conjunction with an identifier in order to maintain a coherent body of information for an entity comprising a consumption history and information. The identifier can comprise identifier 161 stored on the entity and/or an identifier stored and/or composed remotely from the entity.

In an example, the information collected in conjunction with the consumption history can comprise attribute values. For example, attribute values can comprise known, collected, received, cross-referenced, inferred, estimated, processed and/or calculated information related to an entity 160 which is not part of a consumption history. The estimated household size associated with an entity 160 and the average household income for the zip code associated with an entity 160 are examples of attribute values. In some cases, attribute values can be assessed or described using probabilities. For example, an attribute value can reflect that there is a 90% chance that the household income for a family group owning an entity earns between $75,000 and $100,000 per year. In some cases, information can be received and processed into a processed attribute value. For example, attribute values can comprise information which has been statistically obfuscated to address privacy concerns.

In an example, the context of a consumption event, such as the quality of the consumption event, can be part of the consumption history. For example, information associated with the hardware and/or software volume settings during the delivery of an audio advertisement can be collected. For an entity that is a physical device, other information can describe a hardware and/or software configuration and can be included in the consumption history.

In an embodiment, a direct measurement system such as direct measurement system 114, may collect information such as locator keywords and/or referral keywords which were used to locate an item of content using a search engine system 180. A search engine system 180 receives one or more locator keywords from an entity 160 which seeks information relevant to the topics related to the locator keywords. For example, to locate information on where to purchase new internal disk drive which is a specific model number, an entity 160 may submit words such as the four locator keywords: "Buy" "internal" "disk drive" and "model number 123" to a search engine system 180. The search engine system 180 provides results, such as a set of one or more links, which enable the entity 160 to access content 157 from a content provider 156. In an example, a search engine system 150 can present the results of the search to the entity 160 on a web page with a custom URL string which includes the locator keywords embedded in the custom URL string. When an entity 160 selects one of the results, such as a link to a web page, a request for the content 157 is submitted to the content provider 156 from the entity 160, and the referring web page URL can be provided to the content provider 156 and/or a third party system such as a direct measurement system 114 which is integrated with the content provider 156. In some cases, additional information may be available, such as the position of the selected link in the search results.

In addition to or instead of receiving partial and/or comprehensive consumption histories at an internal direct measurement system such as direct measurement system 114, data management module 101 can receive partial and/or comprehensive consumption histories from an external resource such as, but not limited to, an external direct measurement system 190, a content provider 156, a search engine system 180, an external database 170 and/or combinations thereof. In an example, data management module 101 can receive partial or comprehensive information from other resources such as a content provider 156 and/or an external database 170. For example, a content provider may operate systems software on their equipment which records the referral keywords used by entities to access their content 157. In another example, a content provider may operate a local search functionality, such as a search mechanism for locating content limited to the content provider's domain, and may provide a keywords used in conjunction with the local search functionality to the data management module 101. A content provider 156 may provide some or all of this information to the data management module 101.

In some cases, the consumption history can comprise referral keywords; in this case the data management module 101 can provide a unique or non-unique content descriptor (such as a website name, a domain name, a webpage name or IP address) and a list of keywords to the mapping module 102 so that the depersonalized keywords can be discovered and recorded in a storage, such as data repository 106. In an example, data repository 106 can be a database. By accruing referral keywords and locator keywords in conjunction with a content descriptor over time and over a population of entities, a list of depersonalized keywords used to access content identified by the content descriptor can be associated with that content. In some cases, the data management module 101 can withhold the entity identifier 161, such as a cookie value, from the mapping module 102 in order to prevent the long term storage of an entity identifier in conjunction with the content descriptor in data repository 106 and thereby protect privacy.

Data management module 101 can also query the mapping module 102 to request the depersonalized keywords associated with the content identified by a content descriptor in a received consumption history. For example, data management module 101 can receive a consumption history, such as a single consumption event, which includes a content descriptor for identifying the content consumed in the consumption event. The consumption event may or may not include locator keywords and/or referral keywords. The data management module 101 can request the depersonalized keywords associated with the content descriptor and receive the list of depersonalized keywords comprising words historically associated with the content for a population. The data management module can then provide a redacted consumption history to the protected history module for subsequent storage, including the depersonalized keywords instead of a content descriptor for identifying the content. After providing relevant locator keywords and/or referral keywords to the mapping module 102 in conjunction with a content descriptor and providing the redacted event information to the protected history module 104, the data management module 101 can discard some or all of the received consumption history to protect privacy.

The protected history module 104 can now record an association between the entity 160 and the set of depersonalized keywords associated with the consumed item of content in the data repository 106 as a protected consumption history without storing a content descriptor for identifying the content. In some cases, protected history module 104 can be configured to record the association with the list of all depersonalized keywords associated with an item of content. However, in other examples, a subset of the list of all depersonalized keywords may be selected for association with an entity 160. For example, depersonalized keywords may be selected for association with an entity 160 based on recency and/or frequency, with older and/or less popular depersonalized keywords discarded. In some cases, the depersonalized keywords may be weighted in the protected consumption history Mapping module 102 can receive information including keyword usage from a data management module 101, an internal direct measurement system such as direct measurement system 114, an external direct measurement system such as direct measurement system 114, a content provider 156, a search engine system 180, an external database 170 and/or combinations thereof. The mapping module 102 creates maps which associate a set of depersonalized keywords with content for a population and stores the maps in the data repository 106. In an example where the content comprises aggregate content, such as all of the content associated with a website, some or all of the depersonalized keywords for each portion of the content can be aggregated and the aggregate content can be associated with the aggregated depersonalized keywords.

For example, the mapping module 102 can receive a consumption history from a direct measurement system 114 wherein the consumption history includes the set of search terms used by an entity to locate an item of content and a unique identifier for the entity such as a cookie 161. The mapping module can discard the unique identifier to protect entity privacy. In some cases, mapping module 102 can associate related information such as, but not limited to, a time stamp with the depersonalized keywords in the data repository 106. This can be useful for aging off depersonalized keywords which have fallen into disuse, associating a frequency with a depersonalized keyword and/or for identifying emerging depersonalized keyword trends.

Mapping module 102 can associate other related information with the depersonalized keywords in the data repository 106, such as, but not limited to, the rank or position of the content in the search engine's results and/or the identification of the specific search engine system. For example, the related information can be used to weight the importance of a particular depersonalized keyword for an item of content 157. In some cases, some depersonalized keywords may be discarded by the mapping module. For example, some depersonalized keywords may be discarded in an effort to preserve privacy or prevent embarrassment.

As previously described, the mapping module 102 creates maps which associate a set of depersonalized keywords with content for a population over a time period and stores the maps in the data repository 106. In some cases, multiple maps may be created for the same content, with each map corresponding to a different population and/or time horizon. For example, separate maps may be generated for populations of entities grouped by their inferred geographic location and/or their inferred demographic profile. In another example, maps may be generated based on time of day. For example, different maps can be generated to correspond to different time windows such as: ordinary weekday work hours (i.e. Monday thru Friday, 9 AM-5 PM local time for the entity), evenings and weekends.

In some cases, depersonalized keywords may be grouped together for the purposes of frequency counting. For example, words which are lexically similar and common misspelling of depersonalized keywords may be grouped together.

Protected history module 104 receives information such as media consumption histories from data management system 101, including depersonalized keywords. The protected history module 104 can now record an association between the entity 160 and the set of depersonalized keywords associated with the consumed item of content in the data repository 106 as a protected consumption history and discard the content descriptor used for identifying the content, such as a URL, domain name and/or IP (Internet Protocol) Address. In some cases, protected history module 104 can be configured to record the association with the list of all locator keywords associated with an item of content. However, in other examples, a subset of the list of all locator keywords may be selected for association with an entity 160.

In some cases, protected history module 104 can prune the protected consumption histories over time. For example, protected consumption histories can be pruned per individual entity and/or or in groups of entities; in some cases, the protected consumption histories can be pruned based on recency and/or frequency, aging off older depersonalized keywords and/or low frequency depersonalized keywords.

Internet activity related to current news events may be very transient. This can mean that in some cases, locator keywords which are very popular one day, and which may be related to relevant commercial actions, may be irrelevant only a short time later. There are some events, such as an historic landmark catching fire, which occur only once or occur very rarely. Locator keywords "Historic Building A", "Province B" and "burned down" together may be used with great frequency one day to access an online article from an emergency breaking news website about a fire at a Historic Building A in Province B, and may inspire some fraction of the online browsers who read the online article to request online quotes for fire insurance. If a regular consumption history were collected and maintained for an entity (such as "A single entity read the article on "Historic Building A from Province B burning down" and later requested an online quote for fire insurance from the Free Fire Insurance website" in an entity's consumption history), it could be used to build a behavioral model for predicting how entities behave in the case they ever read the news story about the fire at Historic Building A in Province B.

In contrast, it may be more broadly useful to build a model which predicts a relationship between insurance-related behaviors (such as request a quote or fill out an application) and viewing emergency breaking news, but not just at that particular news website and not just one particular insurance company. It is an advantage of some embodiments of the invention that a more general and useful behavioral model can be built using depersonalized keywords instead of specific events without requiring a human to categorize or abstract the events in the consumption history.

For example, the depersonalized keywords associated with receiving the content on the portion of the news website where the Historic Building A fire was reported might include a broad set of depersonalized keywords such as: emergency, injury, police, fire department, Province A, nearby Province C, fire, flood and accident in addition to "Historic Building A". It is expected that other breaking news websites may be characterized by very similar, but not necessarily identical depersonalized keywords. Over time, the depersonalized keyword "Historic Building A" may be pruned out of the list(s) of depersonalized keywords due to low frequency (if it was only high frequency for a brief period of time). However, many of the other more general depersonalized keywords are likely to remain on any breaking emergency news website or blog. In this example, a behavioral model built using depersonalized keywords would capture the geographic feature, the "emergency" feature and the insurance feature, and could be used to predict the future insurance-related behaviors of an entity based on consuming content with common depersonalized keywords such as "emergency". By characterizing a consumption event with some or all of the depersonalized keywords which are associated with the breaking news section of one news website, the event can be broadly characterized. Over time, the locator keywords "Historic Building A" may drop off the list of depersonalized keywords associated with the breaking news section of the news website, but the list of depersonalized keywords which are more stable over time may remain resulting in a list of depersonalized keywords which are categorical in nature, and not just topical. This can serve to partly abstract the details of a rare, specific event into a more useful, broader category of events for the purposes of a consumption history; this can be especially useful with behavioral modeling. Using depersonalized keywords can serve to automatically generalize or categorize consumption events, without requiring human intervention or complex categorization systems.

In some cases, it may be discovered that some depersonalized words are common across multiple content descriptors and that their existence in a protected consumption history doesn't provide meaningful insight; in this case, low impact depersonalized words may also be pruned from some or all consumption histories even if they are recent and/or high frequency.

The selector module 108 receives at least one assessment criterion and uses the assessment criterion to assess an entity for suitability for selection. In an example, the selector module may be used to select entities for an advertising campaign for delivering advertising content to a set of entities over a communications network. In another example, the selector module 108 may be used to select entities for customized content; furthermore, in some cases, content may be customized based on the depersonalized keywords. An example of an assessment criterion can be a set of selected words identified by an advertising campaign operator. The selector module 108 can query the data repository 106 for a set of entities which include all of the selected words as depersonalized keywords in their protected consumption histories. In some cases, an assessment criterion can include weighted words, whereby a campaign operator can indicate the relative importance of finding a selected word in a protected consumption history. Advantageously, this can be a natural way for a campaign operator to characterize their target audience.

In an embodiment, the selector module 108 can be configured to use various matching techniques in the process of assessing an entity. In some examples, an exact match between the selected word and a depersonalized keyword may be required, but in other cases, inexact matches between selected words and depersonalized keywords may be enabled. For example, the depersonalized keywords circuits (plural) and/or circut (misspelled) may be considered a match for the selected word circuit (singular). In another example, the selector module may be configured to identify matches between a selected word and a depersonalized keyword if the meanings are similar. For example, the depersonalized keywords "spigot" and/or "tap" and may be considered matches for the selected word "faucet".

In some examples, the selector module can select, rate and/or rank the entities in the data repository for compliance with the assessment criteria based on the date and/or time stamp associated with a depersonalized keyword, the recency, frequency, weighting and/or search engine results rank of the depersonalized keyword in an entity's protected history. In some cases, additional information can be used to select, rate and/or rank an entity such as the context of the media consumption event such as attribute information and/or context information. In an example, the selector module may be configured to select, rate and/or rank entities based on the absence of one or more depersonalized keywords in the entity's consumption history.

In an embodiment, the audience selection system 100 can operate using models, such as behavioral models. In an example, selector module 108 can include a behavioral modeling system; in other examples, the behavioral modeling can be done in other modules internal and/or external to the audience selection system 100. In an example, an archetypical audience comprising a set of entities representing a known audience of entities, such as a set of entities which have completed an online purchase with a content provider 156, can be identified. For example, the content provider 156 may identify the entities using an identifier 161 and provide the list of identifiers, such as cookies or anonymous identifiers, to the audience selection system 100. In another example, the entities can be selected from a data repository such as data repository 191 associated with the external direct measurement system 190 based on a past behavior, and a set of identifiers 161 can be provided to the audience selection system 100. In another example, a list of entities in an archetypical audience, such as entities which have exhibited a behavior of interest, can be received by the audience selection system 100 and tagged; for example, these entities can be tagged with a campaign reference to enable agglomeration of the archetypical audience inside the audience selection system 100.

In an example, the data repository 106 in the audience selection system 100 can be queried to identify distinctive keywords. A set of distinctive keywords can be identified by identifying depersonalized keywords which appear in the protected consumption histories of the archetypical audience with a frequency that is different from the frequency of depersonalized keywords associated with a standard audience. The frequency of depersonalized keywords found in a standard audience can be determined in a variety of ways. For example, the general statistics related to the keyword usage in conjunction with one or more search engine systems 180 can be provided by the search engine system 180. In another example, a standard audience can be defined as the set of entities documented in the data repository 106, or a subset of the entities documented in the data repository 106, and the frequency of depersonalized keywords can be calculated by querying the data repository 106. In another example, the standard audience can be limited, such as all the entities documented in the data repository 106 which accessed content from a device in the United States.

In an embodiment of the invention, the data management module can be used to assist in the management of a large consumption history database. For example, in some jurisdictions, a consumption history may be kept for an entity for a limited timeframe. In order to comply with such rules, older consumption events may be processed into a set of depersonalized keywords which can be stored to provide a broad sense of an entity's interest while still complying with local laws and regulations by deleting the older consumption events from the system; more recent consumption events may be stored in conjunction with their content descriptors, providing a limited consumption history which may comprise a very detailed record of only the most recent activities. In this hybrid model, a limited consumption history is stored per entity while older consumption history is only characterized broadly using depersonalized keywords. Advantageously, this can enable the compact storage of an older consumption history in a format which is naturally more categorical in nature and more privacy preserving than maintaining very detailed event records.

Figure 2:
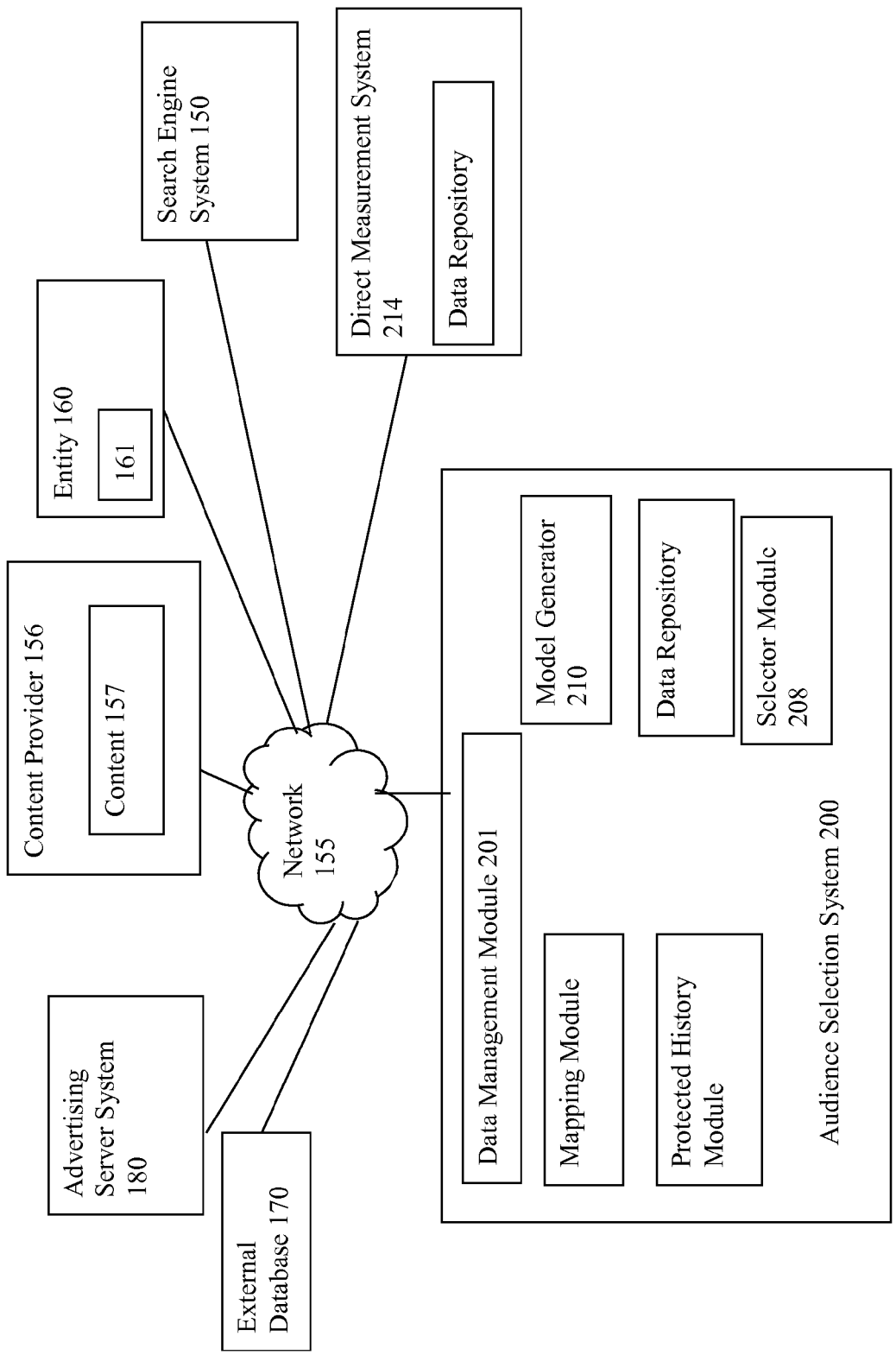
FIG. 2 illustrates an example computing environment in accordance with an embodiment.

FIG. 2 illustrates an example embodiment of the invention. In this example, audience selection system 200 does not include an internal direct measurement system. Instead, this embodiment of the invention operates exclusively using an external direct measurement system 214. Although two direct measurement systems 190 and 114 are shown in FIG. 1 and one direct measurement system is shown in FIG. 2 for clarity, any number of direct measurement systems may be connected to the communication network 155. In some embodiments, no direct measurement system is required for the operation of the invention. For example, information such as the consumption histories of entities and/or the observation of locator keyword usage to locate content 157 may be collected and/or provided by a content provider 156. In another example, the observation of the usage of locator keywords to locate content 157 can be made at the search engine system 180, and the usage can be reported to the audience selection system 100.

Audience selection system 200 comprises an internal model generator 210 for creating models which can be applied to the partial or complete consumption histories of an entity or group of entities by the selector module 208. In other embodiments of the invention, some or all modeling can be done external to the audience selection system 200.

Figure 3:
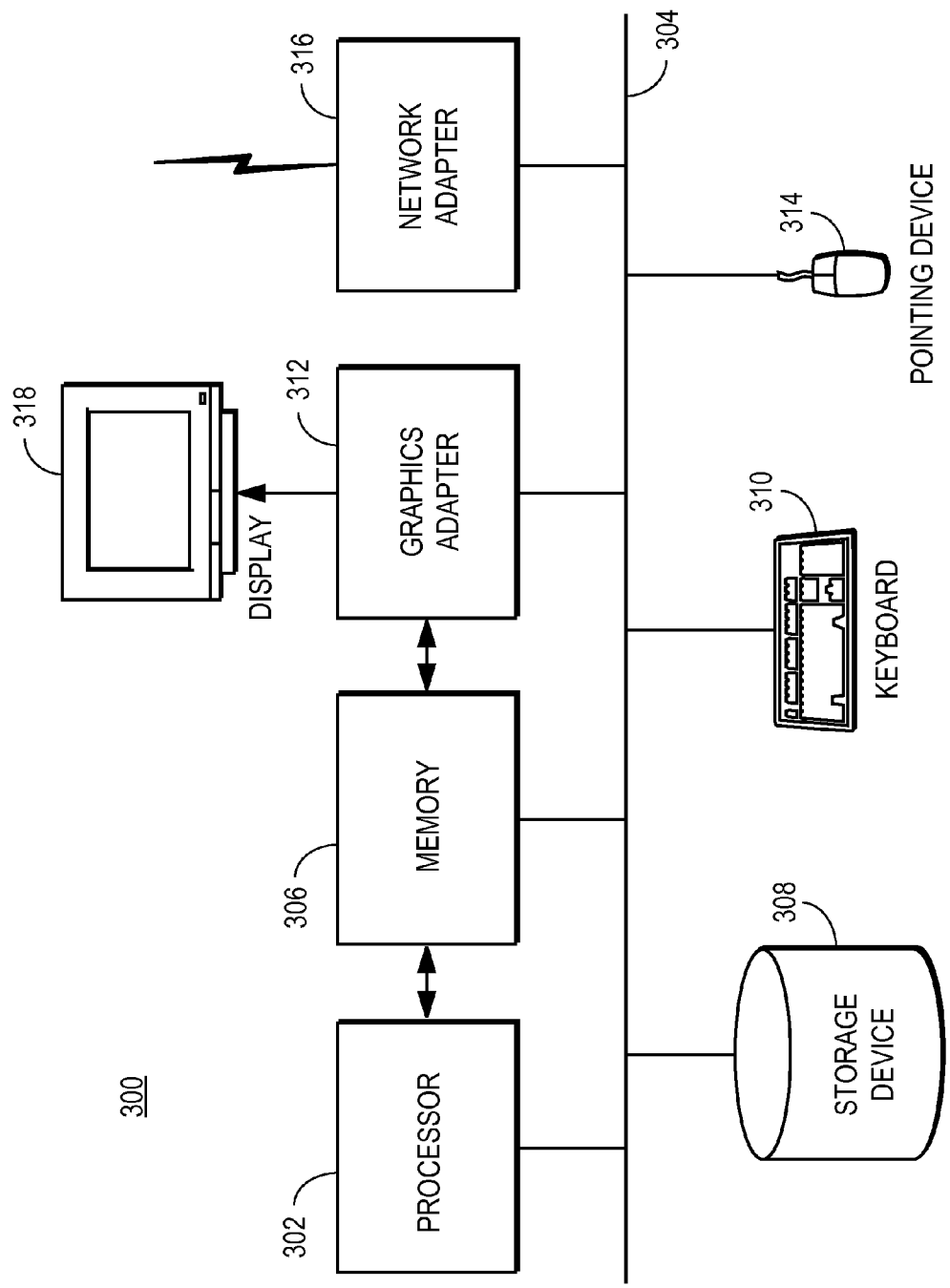
FIG. 3 is a high-level block diagram illustrating an example of a computer for use as an audience selection system, an external database, an advertising server system, a content provider, a client device, a search engine system and/or a direct measurement system of FIGS. 1 and 2.

FIG. 3 is a high-level block diagram illustrating an example of a computer for use as an audience selection system 100 or 200, an external database 170, an advertising server system 180, a content provider 156, a client device 160, a search engine system 180 and/or a direct measurement system 114, 190 or 214 of FIGS. 1 and 2. Illustrated are a processor 302 coupled to a bus 304. Also coupled to the bus 304 are a memory 306, a storage device 308, a keyboard 310, a graphics adapter 312, a pointing device 314, and a network adapter 316. A display 318 is coupled to the graphics adapter 312.

The processor 302 may be any general-purpose processor. The storage device 308 is, in one embodiment, a hard disk drive but can also be any other device capable of storing data, such as a writeable compact disk (CD) or DVD, or a solid-state memory device. The memory 306 may be, for example, firmware, read-only memory (ROM), non-volatile random access memory (NVRAM), and/or RAM, and holds instructions and data used by the processor 302. The pointing device 314 may be a mouse, track ball, or other type of pointing device, and is used in combination with the keyboard 310 to input data into the computer 300. The graphics adapter 312 displays images and other information on the display 318. The network adapter 316 couples the computer 300 to the network (not shown). In one embodiment, the network is the Internet. The network can also utilize dedicated or private communications links that are not necessarily part of the Internet.

As is known in the art, the computer 300 is adapted to execute computer program modules. As used herein, the term "module" refers to computer program logic and/or data for providing the specified functionality. A module can be implemented in hardware, firmware, and/or software. In one embodiment, the modules are stored on the storage device 308, loaded into the memory 306, and executed by the processor 302. The computer 300 is configured to perform the specific functions and operations by various modules, for example as detailed in FIG. 4, and thereby operates as a particular computer under such program control. The types of computers 300 utilized by the entities of FIGS. 1 and 2 can vary depending upon the embodiment and the processing power utilized by the entity.

Figure 4:
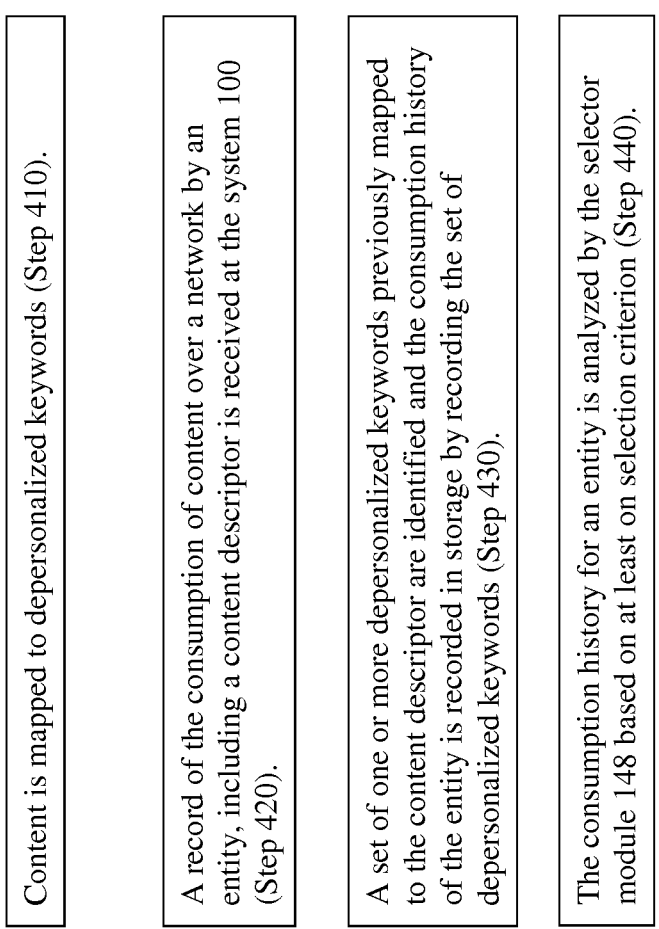
FIG. 4 is a flow chart illustrating an example of a method for selecting an entity according to an embodiment.

An embodiment of the invention is a computer-implemented method for assessing the suitability of an entity. FIG. 4 is a flow chart illustrating an example of a method for assessing the suitability of entities according to an embodiment.

Referring to Step 410, content is mapped to depersonalized keywords. The depersonalized keywords may be received directly from a population of entities through direct measurement. In some cases, the depersonalized keywords may be received from a search engine system 150, an external direct measurement system 190, one or more content providers 156 and/or combinations thereof. Depersonalized keywords comprise keywords used to locate content and are accumulated over one or more populations over a period of time. Mappings indicating the relationship between content and depersonalized keywords can be identified. In some cases, the mappings can be pruned; for example, some rare depersonalized keywords may be ignored and/or depersonalized keywords which have not been used recently may be pruned. In some cases, sensitive depersonalized keywords maybe deleted or ignored; in an example, sensitive depersonalized keywords may be related to sexual orientation, religious beliefs, financial data, health conditions, and/or information which might reasonably be expected to cause embarrassment or offense if exposed to a third party. In another example, locator or referral keywords which include a content descriptor, such as a URL or domain name, may be provided to a search system as part of a search string such as "lookup negative reviews of the new website website.com". In this example, the content descriptor "website.com" is a search term and does not identify content which has necessarily been accessed by an entity. For this reason, it can be included as a depersonalized keyword in some embodiments of the invention. However, in some cases, the system 101 can be configured to purge some or all examples of content descriptors from the protected consumption history of an entity, even if they are not content descriptors for identifying the content consumed by that entity.

Referring to Step 420, a record of the consumption of content over a network by an entity, including a content descriptor is received at the system 100.

Referring to Step 430, a set of one or more depersonalized keywords previously mapped to the content descriptor are identified and the consumption history of the entity is recorded in storage by recording the set of depersonalized keywords. In some cases, the content descriptor may be discarded and not maintained in long term storage in order to protect entity privacy.

Referring to Step 440, the consumption history for an entity is analyzed by the selector module 148 based on at least one selection criterion. Once an entity is selected, subsequent commercial actions can be taken such as, but not limited to, selecting, customizing and/or prioritizing an advertisement for delivery to an entity and/or pricing an advertising opportunity associated with the selected entity. In some cases, an embodiment of the invention can be used in conjunction with an intention targeting system. For example, the archetypical audience can be a set of entities which have completed a specific purchase. To select entities which show a strong likelihood of making the same or a similar purchase, a model can be built based on the behaviors of the archetypical group which preceded the purchase event, with the content related to the behaviors of the archetypical group characterized using depersonalized keywords provided by the mapping module 102. The model can then be used to select entities with similar intentions, targeting them because they exhibit some of the behaviors of an entity which intends to make a purchase. Identifiers, such as targeting cookies, associated with the selected entities in the audience segment can then be sold or auctioned to an interested party.

Figure 5:
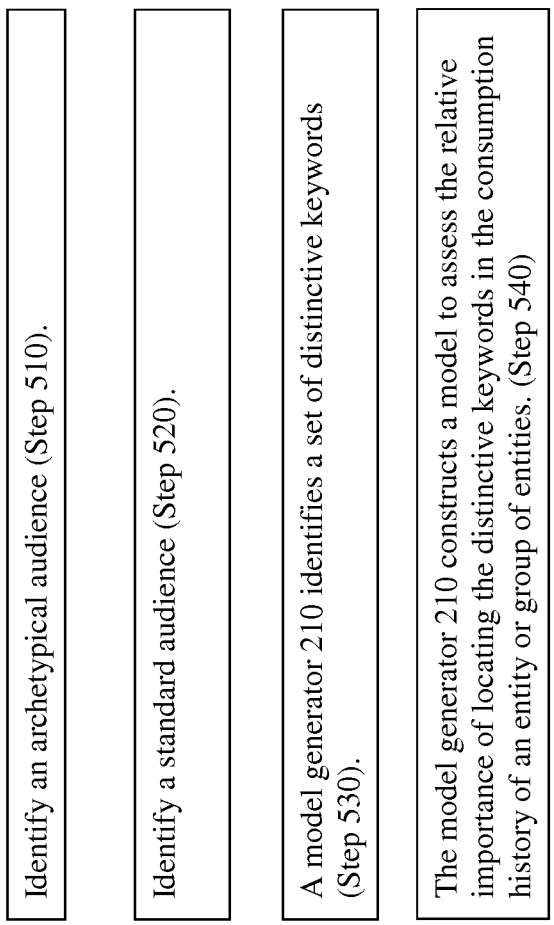
FIG. 5 is a flow chart illustrating an example of a method for creating a model according to an embodiment.

FIG. 5 is a flow chart illustrating an example of a method for creating a model according to an embodiment. Referring to Step 510, an archetypical audience is identified. An advertiser may be interested in selecting an audience segment of one or more entities that is similar to a known, archetypical audience such as the set of entities representing people who are visitors to a popular website. For example, the advertiser may know that an advertising campaign on the popular website is very successful and be interested in selecting a larger or new audience similar to the visitors of the popular website. For example, this can be useful when the inventory of the popular website is exhausted, the advertiser is interested in seeking out less expensive and/or alternate venues for their advertisements, or the advertiser would like to extend their unduplicated reach.

In an example, an archetypical audience of entities can be selected from a data repository 106 by identifying depersonalized keywords of interest. In some cases, the depersonalized keywords may be assigned weights to reflect their relative importance for selection. In some cases, additional constraints may be added to select based on the frequency and/or recency of the depersonalized keywords found in an entity's consumption history.

Referring to Step 520, a standard audience is identified. In some cases, a model generator can incorporate the use of a standard audience. For example, an advertiser may be interested in selecting an audience segment of entities that are more (or less) similar to an archetypical audience than a standard audience, such as the overall Internet audience, the US Internet audience, a website audience, and/or the audience of entities in a specific sales funnel. In some cases, census information, direct measurement data and/or data collected using a questionnaire can be used to select and/or characterize the standard audience. Information, such as a consumption history, associated with the standard audience can be represented using composite measures and/or individual measures.

Referring to Step 530, a model generator identifies a set of distinctive keywords. A A set of distinctive keywords can be identified by identifying depersonalized keywords which appear in the protected consumption histories of the archetypical audience with a frequency that is different from the frequency of depersonalized keywords associated with a standard audience. In an example, the model generator can associate a frequency with each depersonalized keyword and/or each group of depersonalized keywords for a standard audience. The model generator can associate a frequency with each depersonalized keyword and/or each group of depersonalized keywords for an archetypical audience. The distinctive keywords are the depersonalized keywords that appear in the consumption histories of the archetypical audience with a frequency that is significantly different than the frequency found in the consumption histories of the standard audience. In some cases, only distinctive keywords that appear with a higher frequency in the consumption histories of the archetypical audience compared to the standard audience may be considered. However, in other cases, distinctive keywords that appear with a lower frequency in the consumption histories of the archetypical audience compared to the standard audience may be considered instead of or in addition to the high frequency distinctive keywords. In some cases, the model generator can take additional information into account when generating a model such as the recency of a depersonalized keyword.

Referring to Step 540, the model generator constructs a model to assess the relative importance of locating the distinctive keywords in the consumption history of an entity or group of entities. In some cases, additional information can be used to weight the importance of locating a distinctive keyword such as recency and/or frequency within a consumption history. In some cases, additional information such as information related to the context of the consumption events can be incorporated into the models.

In an example, an advertiser may wish to reach an audience of visitors similar to the visitors to a first website. In an example, a model generator can be used to generate a model comprising a set of distinctive keywords. The distinctive keywords may be weighted or ordered. In an example, the distinctive keywords may form a profile, and the complete or partial consumption history of an entity may be assessed based on conformity to the profile. Models generated by the model generator may be used to analyze the complete or partial consumption history of an entity, or group of entities, and score, rate or preferentially select entities which have a consumption history including the distinctive keywords identified by the model.

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A computer-implemented method comprising:
    characterizing multiple items of content accessed over a network, each item of content associated with a content identifier and characterized with a set of multiple depersonalized keywords, the set comprising words submitted to an online search engine by a population comprising multiple entities in the past to locate the content;
    receiving, at a keyword mapping system, a consumption history off an individual entity, the consumption history comprising at least two different content identifiers, each content identifier associated with a respective item of content accessed over the network by the individual entity;
    recording a protected consumption history of the individual entity in a data store at the keyword mapping system, each content identifier of the consumption history represented in the protected consumption history by the respective characteristic set of multiple depersonalized keywords associated with the content identifier's item of content;
    discarding the content identifiers of the consumption history;
    receiving a list of specified keywords;
    determining a frequency of each specified keyword in the depersonalized keywords of the individual entity's protected consumption history; and
    assessing the suitability of the individual entity for receiving selected content based on the frequencies.

2. The method of claim 1 wherein the step of characterizing comprises weighting the depersonalized keywords based on recency.

3. The method of claim 1 wherein the step of characterizing comprises weighting the depersonalized keywords based on frequency.

4. The method of claim 1 wherein the step of characterizing comprises weighting the depersonalized keywords based on relevance.

5. The method of claim 1 wherein assessing the suitability of the individual entity for receiving selected content comprises assessing the suitability of the individual entity for receiving an online advertisement.

6. The method of claim 1 wherein assessing the suitability of the individual entity for receiving selected content comprises assessing the suitability of the individual entity for receiving customized content over the network.

7. The method of claim 1 wherein:
    content comprises aggregate content and aggregate content is characterized by aggregating depersonalized keywords associated with multiple items of content.

8. A non-transitory computer-readable storage medium storing executable computer program instructions for audience selection, the computer program instructions comprising instructions for:
    characterizing multiple items of content accessed over a network, each item of content associated with a content identifier and characterized with a set of multiple depersonalized keywords, the set comprising multiple words submitted to an online search engine by a population comprising multiple entities in the past to locate the content;
    receiving, at a keyword mapping system, a consumption history of an individual entity the consumption history comprising at least two different content identifiers, each content identifier associated with a respective item of content accessed over the network by the individual entity;

recording a protected consumption history of the individual entity in a data store at the keyword mapping system, each content identifier of the consumption history represented in the protected consumption history by the respective characteristic set of multiple depersonalized keywords associated with the content identifier's item of content;

discarding the content identifiers of the consumption history;

receiving a list of specified keywords;

determining a frequency of each specified keyword in the depersonalized keywords of the individual entity's protected consumption history; and assessing the suitability of the individual entity for receiving selected content based on the frequencies.

9. The non-transitory computer-readable storage medium of claim 8 wherein the instructions further comprise:

receiving a protected behavioral model and assessing the suitability of the entity by applying the protected behavioral model to the entity's protected consumption history.

10. The non-transitory computer-readable storage medium of claim 8 wherein the protected consumption history excludes the content descriptor for identifying the content.

11. A system comprising:

a processor;

a computer readable storage medium storing processor-executable computer program instructions for:

characterizing multiple items of content accessed over a network, each item of content associated with a content identifier and characterized with a set of multiple depersonalized keywords, the set comprising words submitted to an online search engine by a population comprising multiple entities in the past to locate the content;

receiving, at a keyword mapping system, a consumption history of an individual entity, the consumption history comprising at least two different content identifiers, each content identifier associated with a respective item of content accessed over the network by the individual entity;

recording a protected consumption history of the individual entity in a data store at the keyword mapping system, each content identifier of the consumption history represented in the protected consumption history by the respective characteristic set of multiple depersonalized keywords associated with the content identifier's item of content;

discarding the content identifiers of the consumption history;

receiving a list of specified keywords;

determining a frequency of each specified keyword in the depersonalized keywords of the individual entity's protected consumption history; and assessing the suitability of the individual entity for receiving selected content based on the frequencies.

12. A system comprising:

a processor;

a computer readable storage medium storing processor-executable computer program instructions for:

characterizing multiple items of content accessed over a network, each item of content associated with a content identifier and characterized with a set of multiple depersonalized keywords, the set comprising words submitted to an online search engine by a population comprising multiple entities in the past to locate the content;

receiving consumption histories of multiple entities, at a keyword mapping system, each respective consumption history comprising at least two different content identifiers, each content identifier associated with a respective item of content accessed over the network by an individual entity;

recording a protected consumption history of each of the multiple entities in a data store at the keyword mapping system, each content identifier in the consumption histories represented in the protected consumption histories by the characteristic set of multiple depersonalized keywords associated with the content identifier's item of content;

discarding the content identifiers of the consumption histories;

receiving a list of specified keywords;

determining a frequency of each specified keyword in the depersonalized keywords of the individual entity's protected consumption history;

identifying a training set comprising entities chosen from the storage based on the frequencies;

building a behavioral model based on the training set wherein features of the behavioral model comprise one or more depersonalized keywords;

receiving a specified entity's protected consumption history; and assessing the suitability of the specific entity for selection by applying the behavioral model to the specified entity's protected consumption history.

13. A computer-implemented method comprising:

accessing a respective protected consumption history of each of a plurality of entities in a storage wherein each protected consumption history comprises a history of the access of multiple items of content over a network by an entity with each item of content characterized by a set of multiple depersonalized keywords, each set comprising multiple words submitted to an online search engine in the past by a population comprising multiple entities to locate each respective item of content, wherein each protected consumption history is purged of content identifiers;

identifying a training set comprising entities chosen from the storage by examining the protected consumption histories for one or more depersonalized keywords;

building a behavioral model based on the training set wherein features of the behavioral model comprise depersonalized keywords;

accessing a specified entity's protected consumption history; and assessing the suitability of the specific entity for selection by applying the behavioral model to the specified entity's protected consumption history.

14. A computer-implemented method comprising:

accessing a respective consumption history of each of a plurality of entities in a storage wherein each consumption history comprises a history of consumption events comprising the access of content over a network by an entity, with the content associated with a content identifier;

selecting a training set comprising entities chosen from the storage, with the consumption history of each entity in the training set including a specified consumption event;

building a behavioral model based on the training set, wherein features of the behavioral model comprise content identifiers;

converting the behavioral model to a protected behavioral model by replacing the content identifiers with depersonalized keywords in the features of the behavioral model;

accessing a specified entity's protected consumption history, the protected consumption history comprising a history of accessing of multiple items of content over a network by the specified entity with each item of content characterized by a set of multiple depersonalized keywords, each set of multiple depersonalized keywords comprising multiple words submitted to an online search engine in the past by a population comprising multiple entities to locate each respective item of content; and assessing the suitability of the specific entity for receiving selected content by applying the protected behavioral model to the specified entity's protected consumption history.

* * * * *